Patented Aug. 31, 1948

2,448,051

UNITED STATES PATENT OFFICE 2,448,051

PRODUCTION OF CARBON

Gustave T. Reich, Philadelphia, Pa.

No Drawing. Application November 13, 1941,
Serial No. 419,027

6 Claims. (Cl. 195—85)

This invention relates to the production of carbon and particularly to a method for the removal of lime from saccharine materials prior to fermentation thereof whereby a low-lime carbon may be obtained by carbonization of the non-volatile fermentation products from such saccharine materials.

In my U. S. Patents Nos. 1,925,204 and 2,043,009, it has been shown that high-grade carbon can be produced from fermented saccharine materials. These materials, such as molasses, sugar house waste water, and the like, may contain such saccharides as sucrose, raffinose, dextrose and levulose, various organic non-sugars and ash-forming constituents. While the ash consists mainly of alkali compounds such as potash and sodium, there are present also, alkaline earth compounds such as lime and magnesium, mainly lime. These saccharine materials, after fermentation, are de-alcoholized and, being in an acid condition, are neutralized, as it has been found that the alkali non-sugars upon heating to the proper temperature yield a very active carbon. When the de-alcoholized liquid is neutralized a large excess of alkali carbonate, such as sodium or potassium carbonate, is required as the lime will be converted into carbonate. Another reaction takes place also, when the alkali carbonate reacts upon the organic matter. Part of the organic matter is liquefied, while another part is precipitated, usually with some alkaline earth compound.

I have found that this method can not only be improved, but manufacturing costs are reduced considerably, also avoiding the incrustation of the still and evaporators if the alkaline earth compounds are removed in an acid condition before distillation, and preferably prior to fermentation, instead of after distillation with an alkali medium.

Molasses, sugar house waste water, and other materials used for fermentation purposes, contain quite a high percentage of alkaline earth compounds. I have found that 80–90% of all the alkaline earth compounds can be effectively removed if proper concentration, temperature, time and pH are maintained. Each influences the result considerably, as well as the condition of the precipitate, greatly affecting the ease of separating it. For example, if molasses is fermented it may contain 1.5% or more alkaline earth compounds, mainly lime. On this basis 50,000 gallons of molasses (600,000 pounds) may contain 9,000 pounds of lime. In general practice the 50,000 gallons of molasses are diluted to 250,000 gallons, yielding the "wort." To this diluted molasses, acid such as sulfuric acid is added, also yeast and yeast food, and the wort is fermented. When the fermentation is completed, the "beer" is de-alcoholized, concentrated in multiple effect evaporators, and as described in my patents, neutralized and charred. As the 9,000 pounds of lime will be converted with sulfuric acid into $CaSO_4.2H_2O$, it will result in 21,630 pounds of $CaSO_4.2H_2O$. Owing to the great dilution, only a fraction of this calcium sulfate is precipitated in the still and evaporators as a scale, while 85–95% of it remains in the de-alcoholized material or "slop." Consequently, a very large quantity of alkali carbonate is required for neutralization and precipitation; also, the volume of liquid processed in the present example would be 250,000 gallons and the cost of the alkali carbonate would be very high. I found that with practically no extra expense for chemicals other than those usually required for the preparation of the "wort," and carrying out the treatment with the alkali carbonate after de-alcoholization for neutralization purposes only, a better product and lower manufacturing cost are obtained.

The method of the invention comprises the removal of lime from fermentable saccharine materials by treating the hot saccharine material in relatively concentrated form and at a pH of 3 to 6.5, with a precipitant for the lime such as sulfuric acid, phosphoric acid, ammonium sulfate, ammonium phosphate, or other soluble sulfates or phosphates or mixtures thereof, and thereafter removing the precipitated calcium compound, for example, by centrifuging or by decantation.

The following is a typical example of a method of operation embodying the principles of my invention:

50,000 gallons of molasses, which may have a density of 80–85° Brix, is mixed with water, for example 50,000 gallons, and after heating to the pasteurizing temperature, usually above 150° F., is treated while hot with sulfuric acid, for example, ½ to 1½ gallons of concentrated sulfuric acid per 1,000 gallons of molasses, so as to give a pH of 3–6.5. The hot mash treated with the sulfuric acid should have a density above 20° Brix, and preferably between 35°–60° Brix, although it may be treated at concentrations up to its original Brix of 80°–85°.

The lime in the concentrated mash is converted at the high temperature into calcium sulfate $CaSO_4.2H_2O$, also part of the suspended organic matter which has a retarding influence upon the fermentation is destroyed or liquefied. If this highly acid hot mash is now kept for approximately ½–2 hours, a fine, crystalline calcium sulfate precipitate is obtained which is easily removed in a centrifuge. A small amount of calcium sulfate remains in solution in the partly diluted molasses, while 80–90% or more of the calcium sulfate is precipitated. During the whole operation, the mash is kept hot, so as to maintain a low viscosity, thus permitting an easy clarification, and, owing to the high temperature, the pasteurized mash is kept clean during the whole operation. After centrifuging the hot mash is cooled, mixed with the proper amount of water, for example, 150,000 gallons, set with yeast and fermented. Owing to the removal of most of the lime, the simultaneous distillation and evaporation of the fermented liquor, for example, as described in my U. S. Patent No. 2,010,929, can be carried out with the greatest of ease, as the scale formation is negligible. After the concentration, the concentrated material is retorted, yielding 20,000 to 30,000 pounds of activated carbon, containing only 500 to 1,000 pounds of CaO, which can be removed with hydrochloric acid.

If produced by the old process, the carbon would contain 7,000 to 8,000 pounds of CaO. The removal of this amount of lime requires 26,110 to 29,840 pounds of 20° Bé. HCl, as compared with 1,850 to 3,730 pounds required in the present process. Another advantage of this process is, that in the retorting 7,000 to 8,000 pounds less CaO are present which in fact would be 17,000 to 19,640 pounds of anhydrous $CaSO_4$, thus requiring considerably larger retorts, more fuel, and a very large treating system for the removal of lime from the carbon.

Owing to the fact that the lime removal is carried out with a highly concentrated, hot liquid, the treatment with sulfuric acid may result in the destruction of valuable organic matter. Therefore, it may be desirable to dilute slightly the sulfuric acid, before introducing it into the hot mash, thereby avoiding carbonization by feeding dilute acid, and producing a better and quicker mixing.

The replacement of a part or all of the sulfuric acid by phosphoric acid, ammonium sulfate or ammonium phosphate, for example, is quite feasible, and is economical to the extent that the nitrogen and phosphorus thereby added is useful as yeast nutrient in the fermentation, it only being necessary that the pH of the treated saccharine material be below 6.5.

I claim:

1. In the production of carbon by carbonization of the non-volatile fermentation products from saccharine materials, the improvement which comprises treating the saccharine material prior to fermentation, at a temperature above atmospheric, and at a pH less than 6.5, with a calcium precipitant selected from the group consisting of sulfuric acid, phosphoric acid and water-soluble sulfates and phosphates, separating the precipitated calcium compound, thereafter subjecting the saccharine material to yeast fermentation, distilling the volatile products of fermentation, concentrating the non-volatile fermentation products, and carbonizing the concentrated material.

2. In the production of carbon by carbonization of the non-volatile fermentation products from saccharine materials, the improvement which comprises treating the saccharine material prior to fermentation, at a temperature of at least 150° F., and at a pH of from about 6.5 to about 3, with a calcium precipitant selected from the group consisting of sulfuric acid, phosphoric acid and water-soluble sulfates and phosphates, separating the precipitated calcium compound, thereafter subjecting the saccharine material to yeast fermentation, distilling the volatile products of fermentation, concentrating the non-volatile fermentation products, and carbonizing the concentrated material.

3. In the production of carbon by carbonization of the non-volatile fermentation products from molasses, the improvement which comprises treating the molasses prior to fermentation at a temperature above atmospheric, and at a pH less than 6.5, with a calcium precipitant selected from the group consisting of sulfuric acid, phosphoric acid and water-soluble sulfates and phosphates, separating the precipitated calcium compound, thereafter subjecting the molasses to yeast fermentation, distilling the volatile products of fermentation, concentrating the non-volatile fermentation products, and carbonizing the concentrated material.

4. In the production of carbon by carbonization of the non-volatile fermentation products from molasses, the improvement which comprises treating the molasses prior to fermentation at a concentration of from 35° to 60° Brix, at a temperature of at least 150° F., and at a pH of from about 6.5 to about 3, with a calcium precipitant selected from the group consisting of sulfuric acid, phosphoric acid and water-soluble sulfates and phosphates, separating the precipitated calcium compound, thereafter subjecting the molasses to yeast fermentation, distilling the volatile products of fermentation, concentrating the non-volatile fermentation products, and carbonizing the concentrated material.

5. In the production of carbon by carbonization of the non-volatile fermentation products from molasses, the improvement which comprises treating the molasses prior to fermentation at a concentration of from 35° to 60° Brix, at a temperature of at least 150° F., and at a pH of from about 6.5 to about 3, with sulfuric acid to precipitate calcium sulfate, separating the precipitated calcium sulfate, thereafter subjecting the molasses to yeast fermentation, distilling the volatile products of fermentation, concentrating the non-volatile fermentation products, and carbonizing the concentrated material.

6. In the production of carbon by carbonization of the non-volatile fermentation products from molasses, the improvement which comprises treating the molasses prior to fermentation at a concentration of from 35° to 60° Brix, at a temperature of at least 150° F., and at a pH of from about 6.5 to about 3, with sulfuric acid to precipitate calcium sulfate, holding the mixture at a temperature above atmospheric for at least one-half hour, separating the precipitated calcium sulfate, thereafter subjecting the molasses to yeast fermentation, distilling the volatile products of fermentation, concentrating the non-volatile fermentation products, and carbonizing the concentrated material.

GUSTAVE T. REICH.

REFERENCES CITED

The following references are of record in the file of this patent:

UNITED STATES PATENTS

| Number | Name | Date |
|---|---|---|
| 1,170,110 | Roth | Feb. 1, 1916 |
| 1,401,433 | Olivarius | Dec. 27, 1921 |
| 1,449,134 | Wohl | Mar. 20, 1923 |
| 1,925,204 | Reich | Sept. 5, 1933 |
| 2,018,869 | Olivarius | Oct. 29, 1935 |
| 2,071,776 | Teatini | Feb. 23, 1937 |
| 2,268,902 | Ryan | Jan. 6, 1942 |